United States Patent
Esfahbod Mirhosseinzadeh Sarabi et al.

(10) Patent No.: US 9,020,272 B1
(45) Date of Patent: Apr. 28, 2015

(54) SAMPLING VECTOR SIGNED DISTANCE FIELD USING ARC APPROXIMATION

(71) Applicant: Google Inc., Mountain View, CA (US)

(72) Inventors: Seyed Behdad Esfahbod Mirhosseinzadeh Sarabi, Toronto (CA); Maysum Panju, Richmond Hill (CA)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 13/843,173

(22) Filed: Mar. 15, 2013

Related U.S. Application Data

(60) Provisional application No. 61/713,394, filed on Oct. 12, 2012.

(51) Int. Cl.
*G06K 9/48* (2006.01)

(52) U.S. Cl.
CPC ..................... *G06K 9/481* (2013.01)

(58) Field of Classification Search
None
See application file for complete search history.

(56) References Cited

U.S. PATENT DOCUMENTS

| | | | |
|---|---|---|---|
| 7,106,332 B2* | 9/2006 | Perry et al. | 345/467 |
| 2002/0097912 A1* | 7/2002 | Kimmel et al. | 382/199 |
| 2007/0116357 A1* | 5/2007 | Dewaele | 382/173 |

OTHER PUBLICATIONS

Sarah F. Frisken, Ronald N. Perry, Alyn P. Rockwood, and Thouis R. Jones, "Adaptively Sampled Distance Fields: A General Representation of Shape for Computer Graphics", 2000, SIGGRAPH '00 Proceedings of the 27th annual conference on computer graphics and interactive techniques, pp. 249-254.*

* cited by examiner

*Primary Examiner* — Bhavesh Mehta
*Assistant Examiner* — Siamak Harandi
(74) *Attorney, Agent, or Firm* — McDermott Will & Emery LLP

(57) ABSTRACT

In one aspect, the present disclosure can be embodied in a method that includes approximating an outline of a vector image using a set of circular arcs. A signed distance value is computed for a selected group of points in a two-dimensional grid associated with the vector image based on a location of each point relative to the approximated outline of the vector image. The nearest are from the respective location of each point in the selected group is identified and the corresponding signed distance value is assigned to each point. The vector image is reproduced based on the signed distance value assigned to each point in the selected group.

15 Claims, 5 Drawing Sheets

SAMPLING VECTOR SIGNED DISTANCE FIELD USING ARC APPROXIMATION

CROSS-REFERENCE TO RELATED APPLICATIONS

The present application claims priority benefit under 35 U.S.C. §119(e) from U.S. Provisional Application No. 61/713,394, titled "SAMPLING VECTOR SIGNED DISTANCE FIELD USING ARC APPROXIMATION" and filed on Oct. 12, 2012, which is incorporated herein by reference in its entirety.

BACKGROUND

The present disclosure relates generally to digital imaging and computer graphics, and particularly, to reproducing vector graphics images for display.

A "signed distance field" (SDF) may be used to map the pixels or points of a digital or vector graphics image to real number values. The value at each pixel or point of the image may represent a distance from that point to a boundary point corresponding to, for example, an outline or border/edge of the image being represented. Furthermore, each point may be assigned a positive or negative value to distinguish between points that are located within a boundary or outline of the image and those that are located outside of the image boundary. For example, points inside the image boundary may be assigned positive values, while points located outside the boundary may be assigned negative values. In some computer graphics applications, samples taken from an SDF representation of a vector image may be used to reconstruct the original image. The SDF can also be used to apply effects on the image, for example, smooth anti-aliasing for cleaner edges when rendering the image. Conventional reconstruction techniques generally involve rasterizing the image first and then, calculating SDF samples using the raster version of the image.

SUMMARY

The disclosed subject matter relates to reconstructing a vector graphics image based on samples from an SDF representation of the image that does not require rasterization. In an example method, an outline of a vector image is approximated using a set of circular arcs. The vector image is associated with a two-dimensional grid of points corresponding to a region of space in which the vector image is to be reproduced. A signed distance value is computed for a selected group of points in a two-dimensional grid associated with the vector image. The computed value is based on a location of each point relative to the approximated outline of the vector image. For each point in the selected group of points, the are is identified from the set of arcs having the lowest absolute distance relative to the location of the respective point. The signed distance value is assigned to each point based on the identification. The vector image is reproduced within the region of space corresponding to the two-dimensional grid of points based on the signed distance value assigned to each point in the selected group.

Other aspects can be embodied in corresponding systems, apparatus, including computer program products.

It is understood that other configurations of the subject technology will become readily apparent from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several embodiments of the subject technology are set forth in the following figures.

DETAILED DESCRIPTION

Figure 1:
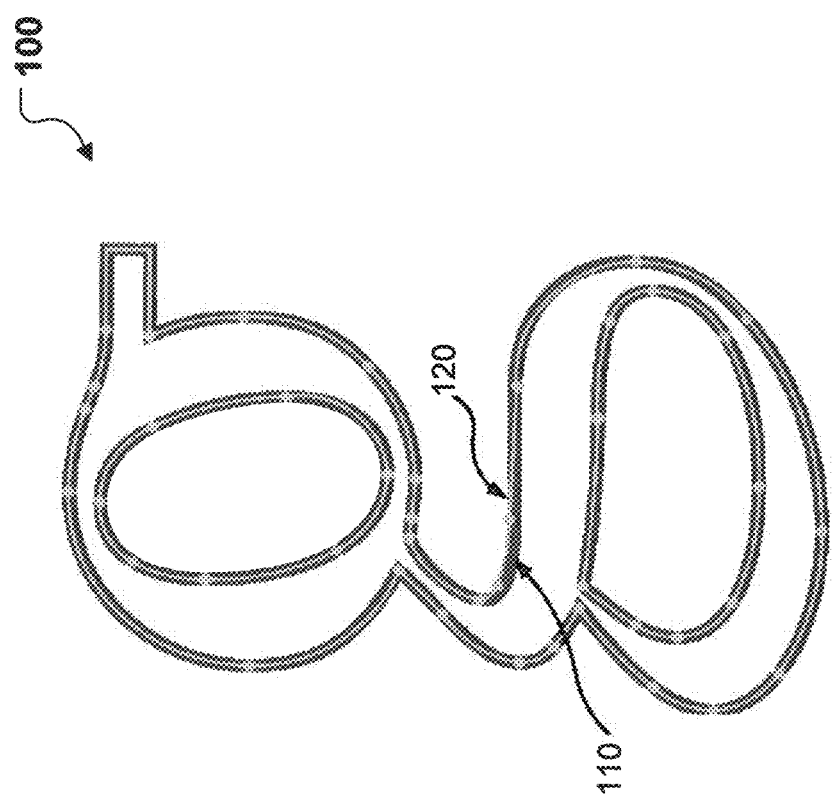
FIG. 1 illustrates an example vector graphics image in the form of a glyph, where an outline of the glyph is approximated using a set of circular arcs.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, the subject technology is not limited to the specific details set forth herein and may be practiced without these specific details.

The disclosed subject technology relates to reconstructing a vector graphics image for display on a display screen of a computing device by sampling a signed distance field (SDF) representation of the image that does not require rasterizing the image. As will be described in further detail below, a curved boundary or outline of a vector image is approximated using a set of circular arcs. The image outline may be approximated using any one or a combination of various conventional or other techniques for approximating curved shapes using circular arcs. The accuracy of the approximation (or amount of approximation error) generally depends upon the kind of approximation technique that is used. Thus, the accuracy of the approximation may be adjusted as desired by using different approximation techniques.

Once the outline of the vector image has been approximated with the set of circular arcs, the arcs may be used to calculate SDF values for different points in a region of space associated with the image. The regions of space may correspond to, for example, a portion of a display screen in which the image is to be displayed or rendered upon being reconstructed. Thus, the SDF points may represent a group of pixels of the display screen within a two-dimensional grid of pixels corresponding to this region. An advantage of the subject technology over conventional solutions is that it does not require rasterizing the image prior to evaluating SDF values for the image. As reproducing an image after rasterizing it is known to produce inaccurate SDF samples that may degrade image quality, the subject technology described herein can improve the accuracy of SDF samples and thus, improve the quality of the reconstructed image.

Another advantage to this approach is that all of the geometry of measuring distances is simplified to finding distances between points and arcs, which is known to be computationally less intensive relative to some conventional techniques. As such, it may be possible to evaluate the SDF at every point/pixel on the relevant portion of the display screen, without imposing any excess burden on computing resources or suffering any additional inaccuracies beyond any error in the original arc approximation. Further, as SDF samples are computed directly from the vector image itself without having to perform any rasterization steps, these techniques can help to improve efficiency and speed of rendering text content in various types of applications (e.g., web browsers or graphics engine for network based applications or services).

In one example, the arc-approximation based SDF sampling techniques described herein are used for rendering text to a display screen of a computing device. In this example, the vector graphics image may be a glyph or graphical representation of a text character according to a particular typeface or font definition. However, it should be noted that the techniques described herein are not intended to be limited to rendering text and may be used for rendering other types of vector graphics images, e.g., a graphical icon or graphics images with curve patterns. In a further example, the techniques described herein may be used for improving the quality of text rendered in combination with other graphics data (e.g., text rendered with geographic information for a digital mapping application).

FIG. 1 illustrates an example glyph 100 for the letter 'g' in which an outline 110 of the original glyph is superimposed with an outline 120 comprising a set of circular arcs used to approximate outline 110. In this example, outline 110 or shape of the original glyph is defined by Bezier curves, each of which are approximated using one or more of the circular arcs in the set of outline 120. The accuracy of the approximation may be a function of the number of arcs used to approximate the outline 110. Accordingly, the approximation may be improved by adjusting (e.g., increasing) the number of arcs that are used to approximate this outline. In some implementations, the number of arcs may be adjusted such that any approximation error is below a predetermined error tolerance or threshold. For example, the approximation may be improved by decreasing the error tolerance and increasing the number of circular arcs used to approximate the Bezier curves of outline 110.

Figure 2:
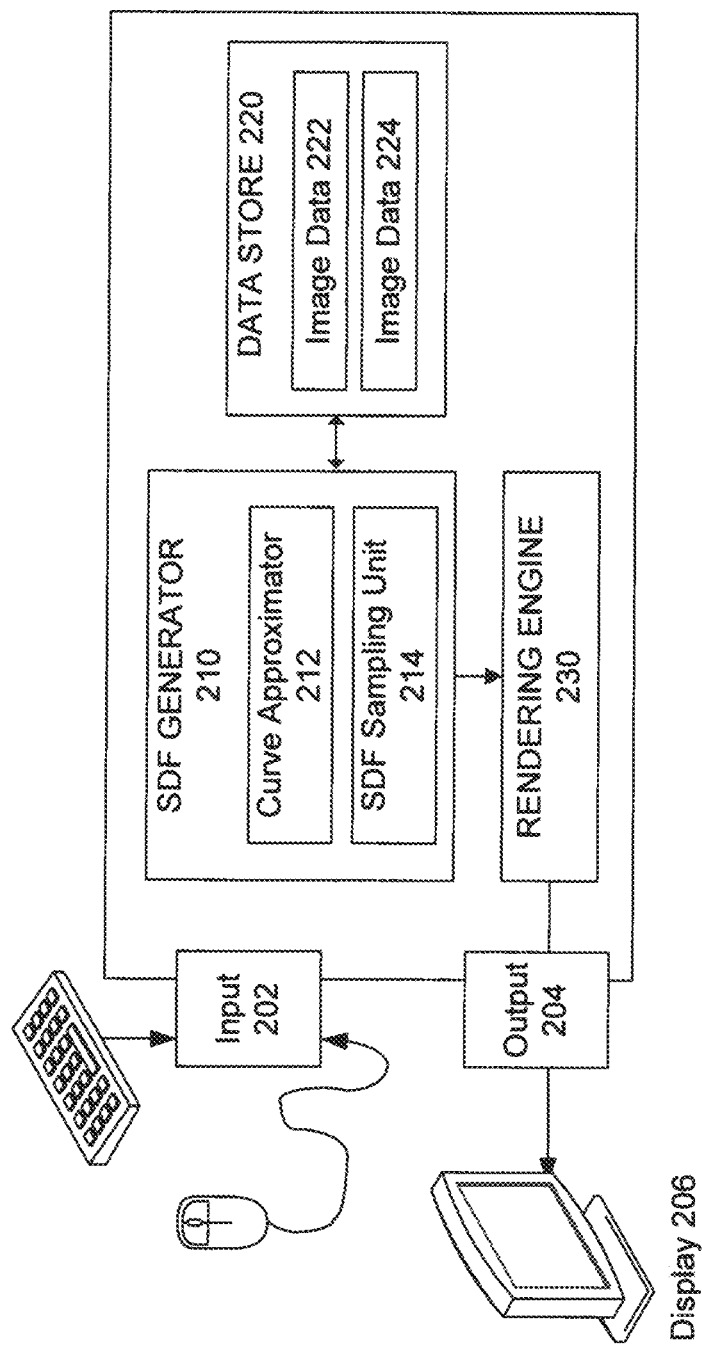
FIG. 2 is a functional block diagram of an example computing system for reconstructing a vector graphics image by sampling a signed distance field (SDF) representation of the image without first rasterizing the image.

FIG. 2 is a functional block diagram of an example computing system 200 for reconstructing a vector graphics image using samples from an SDF representation of the vector image based on arc approximation rather than rasterization. For purposes of discussion, system 200 is described using the example glyph 100 of FIG. 1, as described above, but system 200 is not intended to be limited thereto. As shown in FIG. 2, system 200 includes an input interface 202, an output interface 204, a display 206, an SDF generator 210, a data store 220 and a rendering engine 230. Further, SDF generator 210 includes a curve approximator 212 and a SDF sampling unit 214.

Although not shown in FIG. 2, system 200 may include additional components and device interfaces as may be necessary or desired for a particular implementation. For example, system 200 may also include a network interface (not shown) for communicating information with another computing device or system through a network. Such a network can be any network or combination of networks that can carry data communication. The network may include, but is not limited to, a cellular network, a local area network, medium area network, and/or wide area network, e.g., the Internet, or a combination thereof for communicatively coupling any number of mobile clients, fixed clients, and servers.

System 200 can be implemented using any type of general-purpose or specialized computing device with at least one processor and local memory. Examples of such computing devices may include, but are not limited to, a desktop computer, a laptop computer, a handheld computer, a personal digital assistant (PDA), a cellular telephone, a network appliance, a camera, a mobile handset (e.g., a mobile phone or tablet computer), a media player, a navigation device, an email device, a game console, set-top box, television having a processor and memory for executing and storing instructions or any combination of these or other data processing devices.

As shown in FIG. 2, input interface 202 of system 200 may be used to receive input from a user via one or more user input devices. Examples of such input devices include, but are not limited to, a QWERTY or T9 keyboard, a mouse or other type of pointing device, a microphone or touch-screen display. Also, as shown in FIG. 2, output interface 204 of system 200 may be used to output or display content (e.g., vector graphics images) to display 206. Display 206 may be any type of display device including, for example and without limitation, a cathode ray tube (CRT) monitor, liquid crystal display (LCD) screen or light-emitting diode (LED) display. Display 206 also may be implemented as a touch-screen display capable of receiving user input as well as outputting information to the user. As such, the functionality of interfaces 202 and 204 may be combined into a single input/output interface.

Data store 220 can be any type of memory device or recording medium for storing persistent data. Further, data store 220 may be implemented as a local data storage device or a remote storage device communicatively coupled to system 200, for example, via a network interface (not shown) of system 200. Data store 220 may be used to store any type of data, including data for providing a user interface to compare different states of a digital object corresponding to steps of a visually transformative process (e.g., process 100 of FIG. 1, as described above). As shown in FIG. 2, data store 220 includes different image data 222 and 224. Image data 222 and 224 may be, for example, representations of different vector graphics images, as described above. Also, as described above, such vector images include, but are not limited to, text glyphs having an outline or shape defined using Bezier curves.

In some implementations, SDF generator 210 uses curve approximator 212 to approximate an outline of a vector image (e.g., as represented by image data 222 or 224) using a set of circular arcs. As discussed above, curve approximator 212 may use any of various techniques for approximating a curved boundary or outline of the image using a set of circular arcs or arc segments. In an example, the outline of the vector image being approximated is defined by multiple Bezier curves. In this example, each Bezier curve may be approximated with one or more circular arcs. In a further example, the approximation performed by curve approximator 212 may be based on a predetermined error tolerance or threshold. Accordingly, curve approximator 212 may be configured to adjust the number of the circular arcs within the set of circular arcs such that an approximation error is below the predetermined error tolerance. Additionally or alternatively, the error tolerance may be adjusted to achieve a similar result, e.g., an approximation that achieves an acceptable level of accuracy.

In some implementations, SDF generator 210 uses SDF sampling unit 214 to generate an SDF representation of the vector image after its curved boundary has been approximated by curve approximator 212, as discussed above. As shown in FIG. 3A, the SDF representation may be generated using a sample grid 300A. Sample grid 300A may be, for example, a two-dimensional grid including the vector image, e.g., glyph 100 of FIG. 1, approximated using the set of circular arcs of outline 120, as described above. In some implementations, sample grid 300A is generated using a coarse grid that is drawn over the vector image (e.g., glyph), thereby dividing the set of circular arcs used to approximate the vector image across different cells in a region of space.

In some implementations, the two-dimensional SDF sample grid is used by SDF sampling unit 214 to identify SDF sample points or pixels by, for example, sampling SDF points at regular intervals within the region of space associated with the image. Further, the signed distance values for the SDF sample points or pixels may be determined by first mapping each point to one or more circular arcs or arc segments in the set of arc segments approximating the outline of the image. This may include finding the shortest distance from that point to each arc or arc segment in the set and identifying the nearest arc, e.g., determined to have the least absolute distance relative to other arcs in the set, with respect to the location of the point within the SDF sample grid. The selected distance value to the identified arc is then assigned by SDF sampling unit 214 to the respective point. In this way, the SDF can be used as a function for mapping points in a region of space (or pixels on a screen) to the nearest point representing the outline or edge of the image within the region of space. It should be noted that while the above techniques are described in the context of an SDF, these techniques also may be applied to non-signed distance fields. Rendering engine 230 can then reproduce the vector image using display 206 based on the signed distance value assigned to each point in the selected group of SDF sample points. For example, the vector image may be reproduced within the region of space of display 206 that corresponds to the two-dimensional SDF sample grid.

In some implementations, SDF sampling unit 214 may be further configured to use a preliminary scan to assess the relative distances of arcs determined to be located within the local vicinity (e.g., within a predetermined threshold distance) of each SDF point. Such a preliminary scan may help to limit the number of arcs or arc segments within the set that are used in evaluating the appropriate SDF value for each point, particularly since only the arc that is closest to the point needs to be found. Accordingly, this would help reduce the number of point-to-arc distance computations, and thus, further improve computing performance.

Figure 3B:
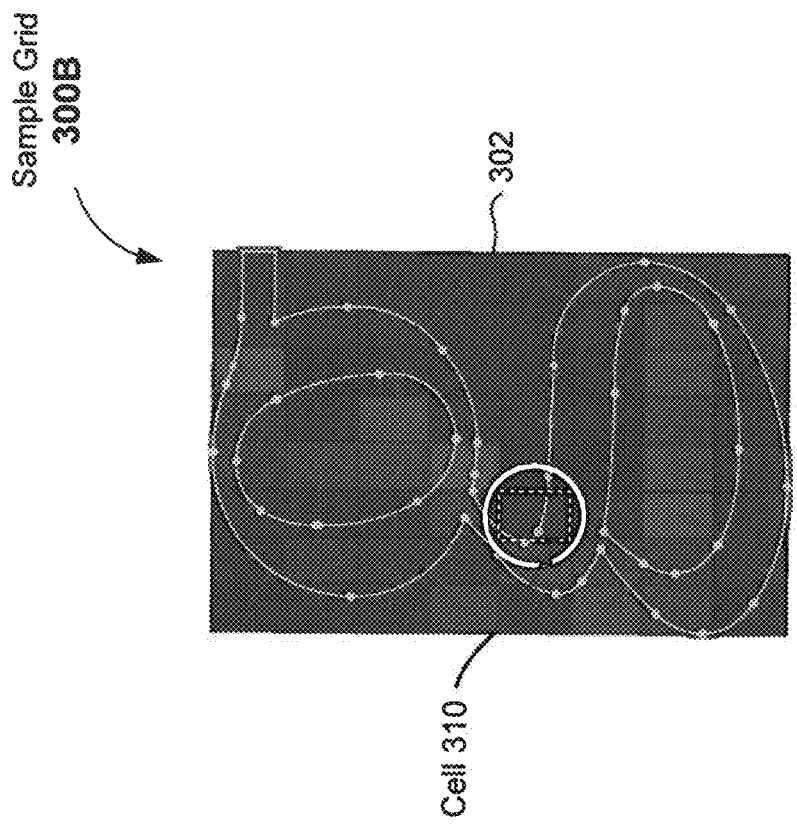
FIG. 3B illustrates the SDF sample grid of FIG. 3A, after mapping each SDF sample point of the grid to its nearest circular arc used to approximate the vector image outline.
Figure 3A:
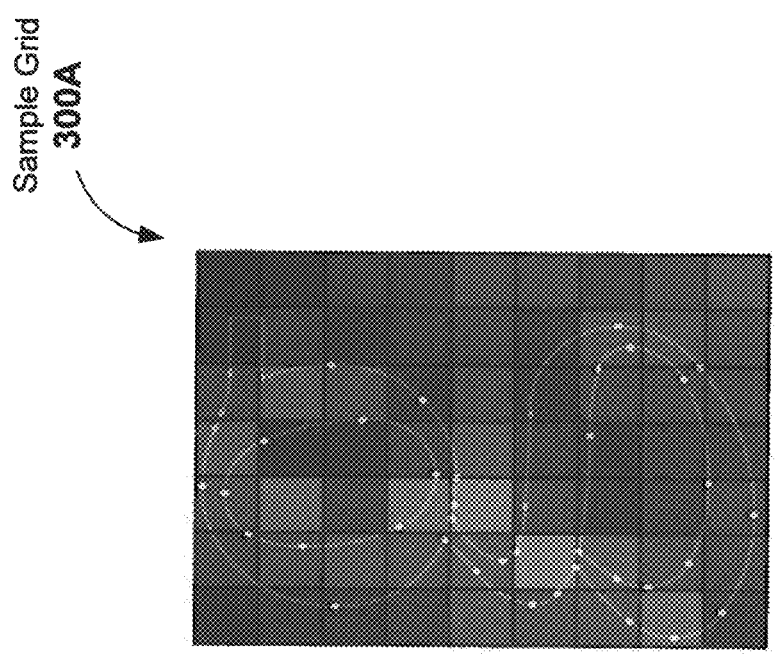
FIG. 3A illustrates an example grid for sampling an SDF representation of a vector graphics image after approximating an outline of the image using a set of circular arcs.

FIG. 3B illustrates an example SDF sample grid 300B, which includes a mapping of each of different SDF sample points within the grid to the nearest circular arc in the set of circular arcs used to approximate the vector image outline. For each cell of sample grid 300B, the shortest distance from the center to any arc is determined (e.g., as represented by line segment 302 in FIG. 3B). In some implementations, for each cell in sample grid 300B, a list of all of the closest arcs on the vector image outline is generated relative to a location of a selected sample point within the cell. In the example shown in FIG. 3B, the selected sample point corresponds to the center of each cell of sample grid 300B. In some implementations, the arcs that are closest to a cell are those arcs for which at least a portion of the arc fall within a predetermined proximity radius relative to the center of the cell. As an example, the proximity radius for a cell 310 of sample grid 300B is represented by the circular area surrounding cell 310. The purpose of this step is to optimize the calculation of the SDF: instead of comparing every point with every arc to find the closest part of the outline to the point, we only need to compare each point with a few relevant arcs.

Figure 4:
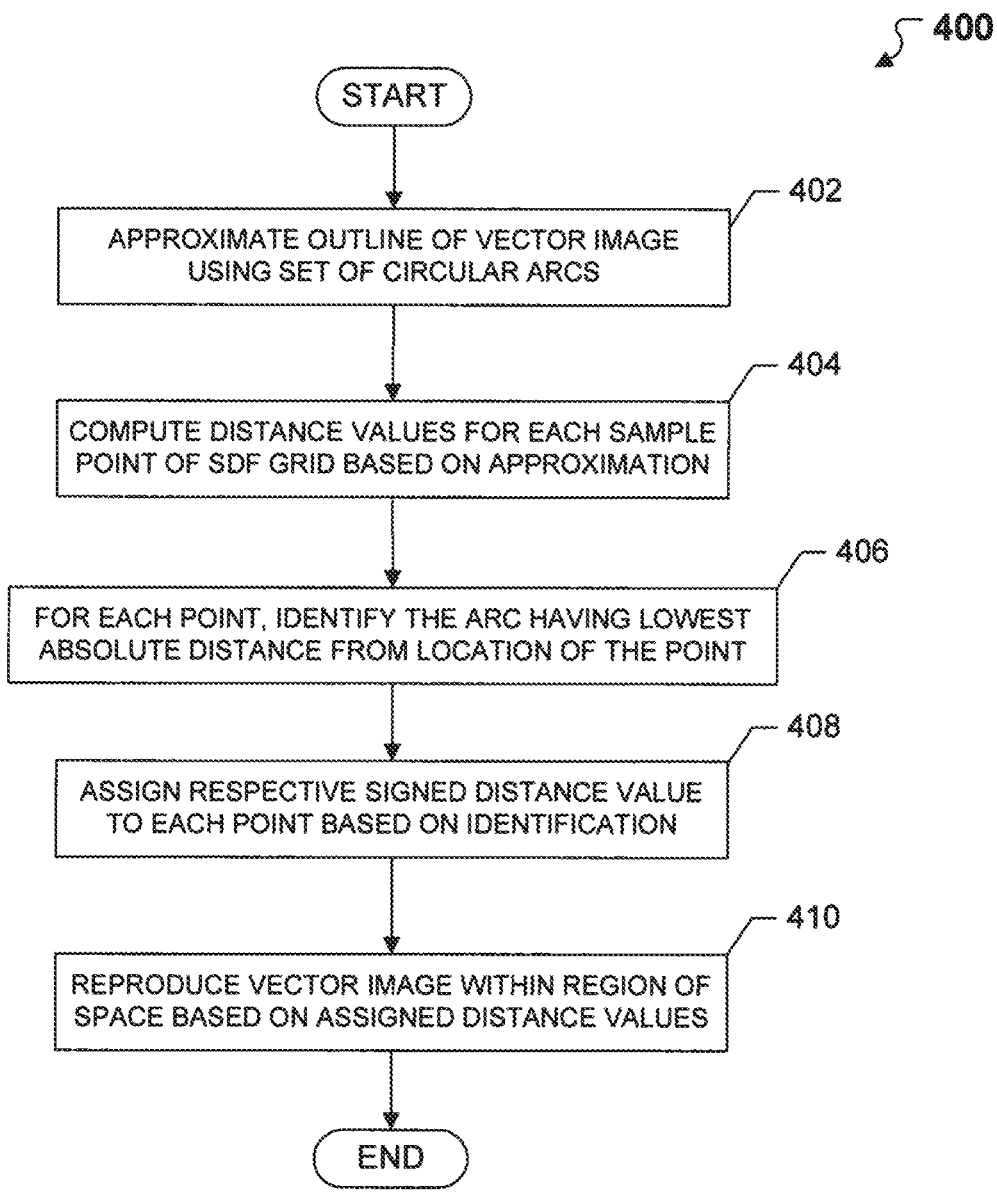
FIG. 4 is a flowchart of an example method for reconstructing a vector graphics image by sampling an SDF representation of the image after approximating an outline of the image using a set of circular arcs.

FIG. 4 is a flowchart of an example method 400 for reconstructing a vector graphics image by sampling an SDF representation of the image after approximating an outline of the image using a set of circular arcs. For purposes of discussion, method 400 will be described using computer system 200 of FIG. 2, as described above. However, method 400 is not intended to be limited thereto. Further, for purposes of discussion, method 400 will be described using the examples SDF sample grids of FIGS. 3A and 3B, as described above, but is not intended to be limited thereto.

Method 400 begins in step 402, which includes approximating an outline of a vector image using a set of circular arcs. The vector image may be associated with a two-dimensional grid of points of an SDF sample grid, as described above. Further, the SDF sample grid may correspond to a region of space of a display screen in which the vector image is to be reproduced. As described above, a Bézier curve defining the outline of the vector image may be segmented into a set of circular arcs that approximate the shape of the curve. The number of arcs in the set may vary as needed depending on the curve. In some implementations, the number of arcs used for each set may be kept below a predetermined threshold. The predetermined threshold may be selected such that the fewest number of arcs needed to approximate the curve while still maintaining a maximum deviation below a certain tolerance. The arcs used to approximate the curve may not be of the same size or length. Further, the length of one or more arcs in the set may be adjusted while keeping the same number of arcs, so long as the result of the approximation of the Bezier curve (e.g., a set of circular arcs) is computationally more efficient for a desired application (e.g., text rendering).

Method 400 then proceeds to step 404, which includes computing a signed distance value for a selected group of points in the two-dimensional grid based on a location of each of the selected points with respect to the approximated outline of the vector image. In step 406, the computed distance values are used to identify an arc from the set of arcs having the lowest absolute distance from the location of each sample point in the selected group of points within the SDF sample grid. In step 408, the signed distance to the identified arc is assigned to each respective point in the selected group. Method 400 can then proceed to step 410, in which the vector image is reproduced within the region of space corresponding to the two-dimensional grid of points based on the signed distance value assigned to each point in the selected group.

In some implementations, method 400 may include additional performance optimization steps. In an example, this may include performing a preliminary scan of the set of arcs to identify a subset of arcs that are located within a predetermined threshold distance of each point in the selected group of points. This may include associating the identified subset of arcs with each respective point in the selected group. By limiting the number of arcs to only the identified subset of arcs associated with each point, the use of such an associated list or subset of arcs may increase efficiency by decreasing the number of computations that have to be performed, particularly with respect to steps 404, 406 and 408, as described above.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 5:
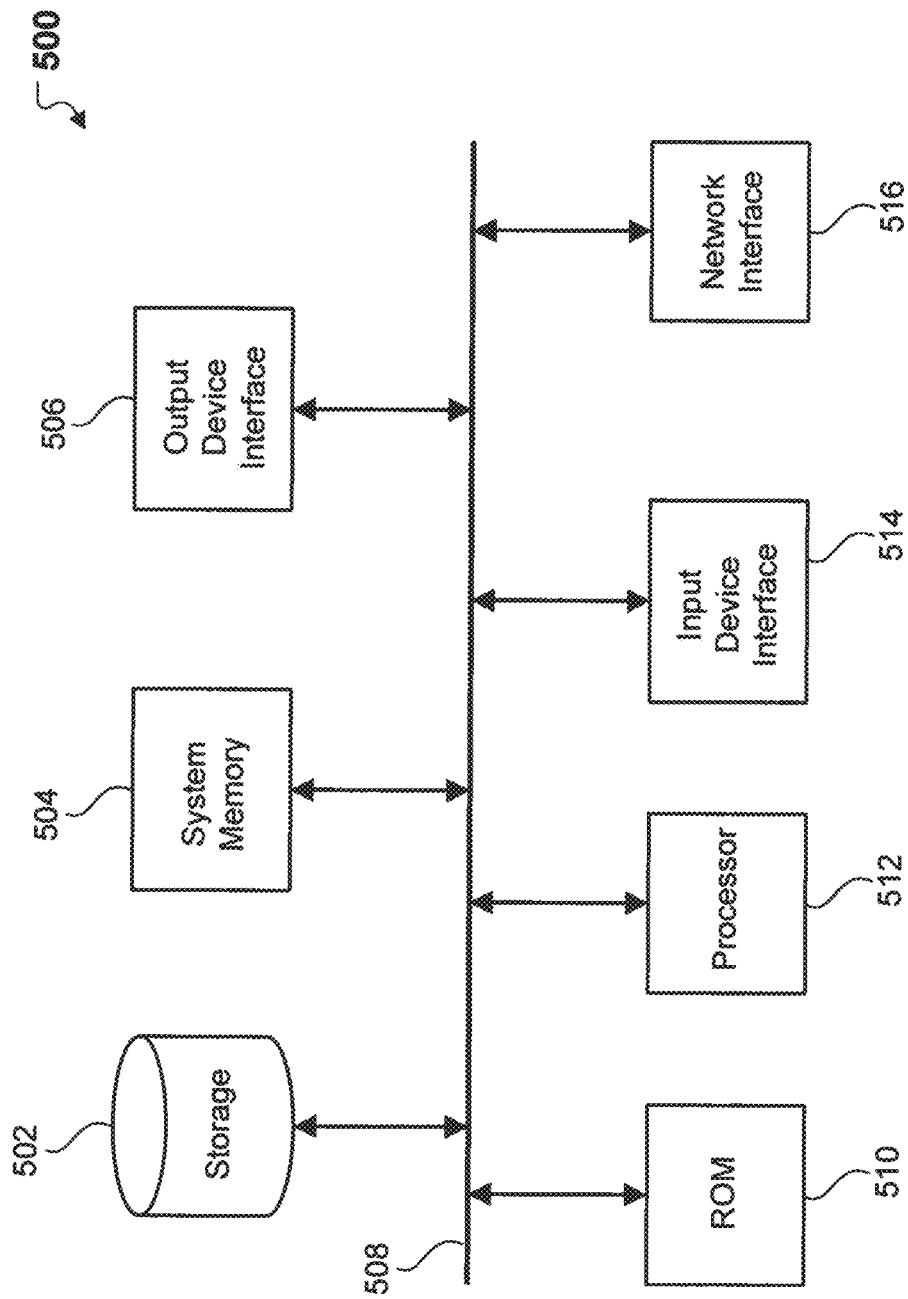
FIG. 5 conceptually illustrates an example electronic system in which portions of the subject technology may be implemented.

FIG. 5 conceptually illustrates an example electronic system 500 with which some implementations of the subject technology are implemented. For example, computing system 200 of FIG. 2, as described above, may be implemented using electronic system 500. Electronic system 500 includes various types of computer readable media and interfaces for various other types of computer readable media. As shown in the example of FIG. 5, electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off Some implementations of the subject disclosure use a mass-storage device (such as a magnetic or optical disk and its corresponding disk drive) as permanent storage device 502.

Other implementations use a removable storage device (e.g., a floppy disk, flash drive or disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. For example, the various memory units include instructions for performing the steps of method 400 of FIG. 4, as described above, in accordance with some implementations. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as cathode ray tubes (CRT) or liquid crystal displays (LCD). Some implementations include devices such as a touch-screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD- R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of exemplary approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A computer-implemented method for reproducing vector images based on signed distance field samples, the method comprising:
    approximating an outline of a vector image using a set of circular arcs, wherein the vector image is associated with a two-dimensional grid of points corresponding to a region of space in which the vector image is to be reproduced;

computing a signed distance value for a selected group of points in the two-dimensional grid based on a location of each of the selected points with respect to the approximated outline of the vector image;

for each point in the selected group of points, identifying an arc from the set of arcs having a lowest absolute distance from the location of the respective point relative to other arcs in the set of arcs;

assigning the signed distance value to each point in the selected group based on the identification; and reproducing the vector image within the region of space corresponding to the two-dimensional grid of points based on the signed distance value assigned to each point in the selected group.

2. The method of claim 1, the method further comprising:

performing a preliminary scan of the set of arcs to identify a subset of arcs that are located within a predetermined threshold distance of each point in the selected group of points; and associating the identified subset of arcs with each respective point in the selected group, wherein the computing, identifying and assigning steps are performed for each point in the two-dimensional grid using only the subset of arcs associated with each point.

3. The method of claim 1, wherein the region of space associated with the vector image corresponds to a portion of a display of a computing device in which the vector image is to be reproduced.

4. The method of claim 1, wherein the vector image is a glyph for a text character.

5. The method of claim 1, wherein the set of circular arcs is adjusted based on a predetermined error tolerance for the approximation.

6. The method of claim 5, wherein the approximating step further comprises:

determining whether an approximation error based on the approximation of the vector image using the set of circular arcs exceeds the predetermined error tolerance; and approximating the outline of the vector image using a second set of circular arcs based on the determination, wherein the second set of circular arcs includes a different number of circular arcs than used for the first approximation.

7. The method of claim 1, wherein the selected group of points in the two-dimensional grid includes a point at a center of each of a plurality of cells of the two-dimensional grid.

8. A system comprising:

one or more processors;

a display; and a memory device including processor-readable instructions, which when executed by the one or more processors, configure the one or more processors to perform functions to:

approximate an outline of a vector image using a set of circular arcs, wherein the vector image is associated with a two-dimensional grid of points corresponding to a region of space in which the vector image is to be reproduced;

compute a signed distance value for a selected group of points in the two-dimensional grid based on a location of each of the selected points with respect to the approximated outline of the vector image;

identify, for each point in the selected group of points, an arc from the set of circular arcs having a lowest absolute distance from the location of the respective point relative to other arcs in the set;

assign the signed distance value to each point in the selected group based on the identification; and reproduce the vector image within the region of space corresponding to the two-dimensional grid of points based on the signed distance value assigned to each point in the selected group.

9. A machine-readable medium comprising instructions stored therein, which when executed by a processor, causes the processor to perform operations comprising:

approximating an outline of a vector image using a set of circular arcs, wherein the vector image is associated with a two-dimensional grid of points corresponding to a region of space in which the vector image is to be reproduced;

computing a signed distance value for a selected group of points in the two-dimensional grid based on a location of each of the selected points with respect to the approximated outline of the vector image;

for each point in the selected group of points, identifying an arc from the set of arcs having a lowest absolute distance from the location of the respective point relative to other arcs in the set of arcs;

assigning the signed distance value to each point in the selected group based on the identification; and reproducing the vector image within the region of space corresponding to the two-dimensional grid of points based on the signed distance value assigned to each point in the selected group.

10. The machine-readable medium of claim 9, wherein the operations performed by the processor further comprise:

performing a preliminary scan of the set of arcs to identify a subset of arcs that are located within a predetermined threshold distance of each point in the selected group of points; and associating the identified subset of arcs with each respective point in the selected group, wherein the computing, identifying and assigning steps are performed for each point in the two-dimensional grid using only the subset of arcs associated with each point.

11. The machine-readable medium of claim 9, wherein the region of space associated with the vector image corresponds to a portion of a display of a computing device in which the vector image is to be reproduced.

12. The machine-readable medium of claim 9, wherein the vector image is a glyph for a text character.

13. The machine-readable medium of claim 9, wherein the set of circular arcs is adjusted based on a predetermined error tolerance for the approximation.

14. The machine-readable medium of claim 13, wherein the processor performs further operations comprising:

determining whether an approximation error based on the approximation of the vector image using the set of circular arcs exceeds the predetermined error tolerance; and approximating the outline of the vector image using a second set of circular arcs based on the determination, wherein the second set of circular arcs includes a different number of circular arcs than used for the first approximation.

15. The machine-readable medium of claim 9, wherein the selected group of points in the two-dimensional grid includes a point at a center of each of a plurality of cells of the two-dimensional grid.

* * * * *